(12) United States Patent
Canova, Jr. et al.

(10) Patent No.: US 8,804,332 B2
(45) Date of Patent: Aug. 12, 2014

(54) HANDHELD COMPUTER

(75) Inventors: Francis James Canova, Jr., Fremont, CA (US); Jeffrey C. Hawkins, Redwood City, CA (US); Traci Angela Neist, Palo Alto, CA (US); Dennis Joseph Boyle, Palo Alto, CA (US); Robert Gregory Twiss, Portola Valley, CA (US); Amy Aimei Han, Mountain View, CA (US); Elisha Avraham Tal, Maccahim (IL); Madeleine Francavilla, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 11/772,093

(22) Filed: Jun. 29, 2007

(65) Prior Publication Data

US 2007/0279859 A1     Dec. 6, 2007

Related U.S. Application Data

(63) Continuation of application No. 11/385,241, filed on Mar. 20, 2006, now Pat. No. 7,333,326, which is a continuation of application No. 10/080,437, filed on Feb. 21, 2002, now Pat. No. 7,061,762, which is a continuation of application No. 09/244,440, filed on Feb. 4, 1999, now Pat. No. 6,388,877.

(51) Int. Cl.
*G06F 1/16*     (2006.01)

(52) U.S. Cl.
USPC ............ 361/679.56; 361/679.02; 361/679.21; 361/679.3; 361/679.55

(58) Field of Classification Search
USPC ............ 361/679.01, 679.08, 679.09, 679.56, 361/679.02, 679.3, 679.21, 679.26, 679.55; 395/144–149, 24, 143, 155; 200/5 A, 200/5 R, 6 A, 17 R, 18, 353, 357, 517, 292, 200/229, 341, 345, 168, 344; 455/566, 455/566.1, 566.2, 569, 575, 568, 90; 379/88.13, 93.17, 110.01, 433, 434
See application file for complete search history.

(56) References Cited

U.S. PATENT DOCUMENTS

| | | | |
|---|---|---|---|
| 3,744,034 A | | 7/1973 | Paul |
| 4,547,860 A | * | 10/1985 | Lapeyre .................. 708/146 |
| 4,559,705 A | | 12/1985 | Hodge et al. |

(Continued)

FOREIGN PATENT DOCUMENTS

| | | | | |
|---|---|---|---|---|
| JP | 407248867 A | | 9/1995 | |
| JP | 408129530 A | * | 5/1996 | ............ G06F 15/02 |

(Continued)

OTHER PUBLICATIONS

U.S. Appl. No. 60/113,181, filed Dec. 21, 1998, Kim et al.

(Continued)

*Primary Examiner* — Michail V Datskovskiy

(57) ABSTRACT

A handheld computer having a housing with a midframe construction is described. The housing includes a front shell and a back shell coupled to a midframe. The handheld computer also includes two accessory slots for a stylus or other devices on the left and right sides of the housing. The handheld computer also includes an infrared port which is an integral portion of the housing.

20 Claims, 14 Drawing Sheets

(56) References Cited

U.S. PATENT DOCUMENTS

| | | | |
|---|---|---|---|
| D288,746 S | 3/1987 | Allekotte | |
| 4,853,888 A * | 8/1989 | Lata et al. | 345/172 |
| 4,868,376 A * | 9/1989 | Lessin et al. | 235/492 |
| 4,896,003 A | 1/1990 | Hsieh | |
| D306,176 S | 2/1990 | Yubisui et al. | |
| 4,916,441 A | 4/1990 | Gombrich | |
| 4,927,986 A | 5/1990 | Daly | |
| 4,972,496 A | 11/1990 | Sklarew | |
| 4,992,631 A * | 2/1991 | Gee | 200/5 A |
| 5,040,296 A | 8/1991 | Yerger | |
| 5,049,862 A | 9/1991 | Dao et al. | |
| D326,446 S | 5/1992 | Wong | |
| 5,124,940 A * | 6/1992 | Lapeyre | 708/146 |
| 5,128,829 A | 7/1992 | Loew | |
| 5,165,415 A | 11/1992 | Wallace et al. | |
| 5,189,632 A * | 2/1993 | Paajanen et al. | 708/109 |
| 5,205,017 A | 4/1993 | Wang | |
| 5,231,381 A | 7/1993 | Duwaer | |
| 5,253,142 A | 10/1993 | Weng | |
| 5,261,042 A * | 11/1993 | Brandt | 715/841 |
| 5,283,862 A | 2/1994 | Lund | |
| 5,305,394 A | 4/1994 | Tanaka | |
| D346,591 S | 5/1994 | Lee | |
| 5,323,291 A | 6/1994 | Boyle | |
| 5,337,346 A * | 8/1994 | Uchikura | 455/556.2 |
| 5,383,141 A * | 1/1995 | Lapeyre | 708/146 |
| D355,165 S | 2/1995 | Sakaguchi et al. | |
| 5,389,745 A | 2/1995 | Sakamoto | |
| D356,550 S | 3/1995 | Mizusugi et al. | |
| 5,398,310 A | 3/1995 | Tchao et al. | |
| 5,401,917 A | 3/1995 | Yoshida et al. | |
| 5,404,267 A * | 4/1995 | Silva et al. | 361/679.03 |
| 5,422,442 A | 6/1995 | Gouda et al. | |
| 5,430,248 A | 7/1995 | Levy | |
| 5,434,929 A | 7/1995 | Beernink et al. | |
| 5,444,192 A | 8/1995 | Shetye et al. | |
| 5,448,433 A | 9/1995 | Morehouse et al. | |
| 5,452,371 A | 9/1995 | Bozinovic et al. | |
| 5,476,336 A | 12/1995 | Osiecki et al. | |
| D366,220 S | 1/1996 | Sakamoto | |
| D366,463 S | 1/1996 | Ive et al. | |
| 5,489,924 A | 2/1996 | Shima et al. | |
| D368,079 S | 3/1996 | Ive et al. | |
| 5,497,339 A * | 3/1996 | Bernard | 708/109 |
| 5,506,749 A | 4/1996 | Matsuda | |
| 5,526,411 A | 6/1996 | Krieter | 379/110.01 |
| 5,528,743 A | 6/1996 | Tou et al. | |
| 5,534,888 A * | 7/1996 | Lebby et al. | 345/672 |
| 5,534,892 A | 7/1996 | Tagawa | |
| 5,548,477 A | 8/1996 | Kumar et al. | |
| 5,550,715 A | 8/1996 | Hawkins et al. | |
| 5,555,157 A | 9/1996 | Moller et al. | |
| 5,563,996 A * | 10/1996 | Tchao | 715/201 |
| 5,564,850 A | 10/1996 | Nagaoka | |
| 5,568,357 A * | 10/1996 | Kochis et al. | 361/679.26 |
| 5,574,625 A * | 11/1996 | Ohgami et al. | 361/679.09 |
| 5,576,502 A | 11/1996 | Fukushima et al. | |
| 5,579,487 A * | 11/1996 | Meyerson et al. | 710/100 |
| 5,612,719 A * | 3/1997 | Beernink et al. | 345/173 |
| 5,615,284 A | 3/1997 | Rhyne et al. | |
| 5,617,343 A | 4/1997 | Danielson et al. | |
| 5,621,817 A | 4/1997 | Bozinovic et al. | |
| 5,625,673 A * | 4/1997 | Grewe et al. | 455/556.2 |
| 5,630,148 A | 5/1997 | Norris | |
| 5,635,682 A | 6/1997 | Cherdak et al. | |
| 5,638,257 A | 6/1997 | Kumar et al. | |
| 5,646,649 A | 7/1997 | Iwata et al. | |
| 5,657,459 A | 8/1997 | Yanagisawa et al. | |
| 5,661,632 A * | 8/1997 | Register | 361/679.3 |
| D385,299 S | 10/1997 | Adams | |
| 5,675,524 A * | 10/1997 | Bernard | 708/109 |
| 5,698,822 A | 12/1997 | Haneda et al. | |
| 5,710,728 A * | 1/1998 | Danielson et al. | 713/321 |
| 5,737,183 A | 4/1998 | Kobayashi et al. | |
| 5,757,681 A | 5/1998 | Suzuki et al. | |
| 5,767,464 A * | 6/1998 | Dyer et al. | 200/5 A |
| 5,786,061 A | 7/1998 | Banfield | |
| 5,797,089 A * | 8/1998 | Nguyen | 455/403 |
| 5,797,098 A * | 8/1998 | Schroeder et al. | 455/464 |
| D397,679 S | 9/1998 | Hawkins et al. | |
| 5,805,474 A * | 9/1998 | Danielson et al. | 361/679.56 |
| 5,810,461 A | 9/1998 | Ive et al. | |
| 5,818,182 A | 10/1998 | Viswanadham | |
| 5,818,437 A * | 10/1998 | Grover et al. | 715/811 |
| 5,821,510 A | 10/1998 | Cohen et al. | |
| 5,831,613 A | 11/1998 | Johnston et al. | |
| 5,835,343 A * | 11/1998 | Johns et al. | 361/679.27 |
| 5,841,901 A | 11/1998 | Arai et al. | |
| 5,845,282 A * | 12/1998 | Alley et al. | 1/1 |
| 5,848,298 A | 12/1998 | Steere, Jr. et al. | |
| 5,862,395 A * | 1/1999 | Bier | 712/1 |
| 5,873,045 A * | 2/1999 | Lee et al. | 455/556.2 |
| 5,873,372 A | 2/1999 | Honeycutt | |
| 5,889,512 A | 3/1999 | Moller et al. | |
| D408,021 S | 4/1999 | Haitani et al. | |
| D408,372 S | 4/1999 | Ota et al. | |
| 5,894,276 A * | 4/1999 | Altidor et al. | 340/825.22 |
| 5,894,425 A | 4/1999 | Saliba | |
| 5,898,568 A | 4/1999 | Cheng | |
| D410,440 S | 6/1999 | Carnell | |
| 5,913,629 A | 6/1999 | Hazzard | |
| 5,914,708 A | 6/1999 | La Grange et al. | |
| 5,929,774 A * | 7/1999 | Charlton | 340/7.1 |
| 5,941,648 A | 8/1999 | Robinson | |
| 5,942,177 A | 8/1999 | Banfield | |
| 5,953,205 A | 9/1999 | Kambayashi et al. | |
| 5,974,334 A * | 10/1999 | Jones, Jr. | 455/556.2 |
| 5,982,351 A * | 11/1999 | White et al. | 715/810 |
| 5,982,876 A * | 11/1999 | Albesa | 379/354 |
| 5,983,073 A * | 11/1999 | Ditzik | 455/11.1 |
| D417,657 S | 12/1999 | Matsumoto | |
| 5,996,956 A | 12/1999 | Shawver | |
| 5,999,827 A | 12/1999 | Sudo et al. | |
| 5,999,908 A * | 12/1999 | Abelow | 705/1 |
| 6,014,573 A * | 1/2000 | Lehtonen et al. | 455/569.1 |
| D420,987 S | 2/2000 | Miyahara et al. | |
| 6,028,765 A | 2/2000 | Swindler et al. | |
| 6,032,866 A | 3/2000 | Knighton et al. | |
| 6,034,685 A | 3/2000 | Kuriyama et al. | |
| D422,271 S | 4/2000 | Kawashima | |
| D423,468 S | 4/2000 | Jenkins | |
| 6,046,684 A * | 4/2000 | Hamersley et al. | 340/825.69 |
| 6,047,196 A * | 4/2000 | Makela et al. | 455/556.1 |
| 6,052,120 A * | 4/2000 | Nahi et al. | 715/700 |
| 6,052,279 A * | 4/2000 | Friend et al. | 361/679.32 |
| D424,533 S | 5/2000 | Kandalepas | |
| D424,535 S | 5/2000 | Peltola | |
| 6,057,814 A * | 5/2000 | Kalt | 345/58 |
| D426,236 S | 6/2000 | Kim et al. | |
| 6,073,033 A * | 6/2000 | Campo | 455/566 |
| 6,084,584 A * | 7/2000 | Nahi et al. | 715/864 |
| 6,102,721 A | 8/2000 | Seto et al. | |
| 6,104,334 A * | 8/2000 | Allport | 341/175 |
| 6,115,248 A | 9/2000 | Canova et al. | |
| 6,125,287 A * | 9/2000 | Cushman et al. | 455/566 |
| 6,160,926 A * | 12/2000 | Dow et al. | 382/313 |
| 6,166,734 A * | 12/2000 | Nahi et al. | 715/748 |
| D436,963 S | 1/2001 | Kim et al. | |
| 6,178,087 B1 * | 1/2001 | Cho et al. | 361/679.23 |
| 6,195,569 B1 * | 2/2001 | Frederiksen | 455/566 |
| 6,195,589 B1 | 2/2001 | Ketcham | |
| 6,201,554 B1 * | 3/2001 | Lands | 345/169 |
| D440,542 S | 4/2001 | Hawkins et al. | |
| 6,219,256 B1 | 4/2001 | Wu | |
| 6,229,695 B1 * | 5/2001 | Moon | 361/679.3 |
| 6,239,968 B1 | 5/2001 | Kim et al. | |
| 6,256,019 B1 * | 7/2001 | Allport | 345/169 |
| 6,259,932 B1 * | 7/2001 | Constien | 455/556.1 |
| 6,266,539 B1 * | 7/2001 | Pardo | 455/556.2 |
| 6,292,273 B1 * | 9/2001 | Dow et al. | 358/473 |
| 6,301,101 B1 * | 10/2001 | Anzai et al. | 361/679.3 |
| 6,362,850 B1 * | 3/2002 | Alsing et al. | 348/239 |
| D455,146 S | 4/2002 | Tsuboi | |
| D456,289 S | 4/2002 | Laverick | |

(56) References Cited

U.S. PATENT DOCUMENTS

| | | | |
|---|---|---|---|
| 6,370,282 B1 * | 4/2002 | Pavley et al. | 382/311 |
| 6,392,639 B1 | 5/2002 | Lee et al. | |
| 6,415,138 B2 * | 7/2002 | Sirola et al. | 455/90.1 |
| 6,437,836 B1 * | 8/2002 | Huang et al. | 348/734 |
| 6,445,383 B1 * | 9/2002 | Chambers et al. | 345/173 |
| 6,445,932 B1 * | 9/2002 | Soini et al. | 455/556.1 |
| D466,504 S | 12/2002 | Masuda et al. | |
| D467,918 S | 12/2002 | Fitch et al. | |
| 6,498,601 B1 * | 12/2002 | Gujar et al. | 345/173 |
| 6,502,090 B1 * | 12/2002 | Raisanen | 707/3 |
| D469,061 S | 1/2003 | Porter | |
| 6,505,055 B1 * | 1/2003 | Kahn et al. | 455/564 |
| 6,532,152 B1 * | 3/2003 | White et al. | 361/692 |
| 6,542,721 B2 * | 4/2003 | Boesen | 455/553.1 |
| 6,560,092 B2 | 5/2003 | Itou et al. | |
| 6,611,693 B2 * | 8/2003 | Soini et al. | 455/556.1 |
| 6,658,268 B1 * | 12/2003 | Bodnar et al. | 455/556.2 |
| D488,162 S | 4/2004 | Korpai | |
| 6,781,825 B2 | 8/2004 | Shih et al. | |
| 6,842,335 B1 | 1/2005 | Hanson | |
| D502,703 S | 3/2005 | Tsujimoto et al. | |
| 6,882,859 B1 * | 4/2005 | Rao et al. | 455/550.1 |
| 6,950,516 B2 | 9/2005 | Piria et al. | |
| D511,342 S | 11/2005 | Chien | |
| 7,072,688 B2 * | 7/2006 | Bodnar et al. | 455/556.2 |
| D530,698 S | 10/2006 | Lee et al. | |
| D532,440 S | 11/2006 | Oas | |
| 7,145,766 B2 | 12/2006 | Homer et al. | |
| 7,205,959 B2 | 4/2007 | Henriksson | |
| 7,231,208 B2 | 6/2007 | Robertson et al. | |
| D548,732 S | 8/2007 | Cebe et al. | |
| 7,312,984 B2 | 12/2007 | Richardson et al. | |
| 7,448,702 B2 | 11/2008 | Chen et al. | |
| 2002/0085342 A1 | 7/2002 | Chen et al. | |
| 2002/0101707 A1 | 8/2002 | Canova | |
| 2003/0053288 A1 | 3/2003 | Netzel et al. | |
| 2003/0157957 A1 | 8/2003 | Wendorff | |
| 2004/0150943 A1 | 8/2004 | Rock | |
| 2005/0139498 A1 | 6/2005 | Goros | |
| 2005/0264988 A1 | 12/2005 | Nicolosi | |
| 2005/0272484 A1 | 12/2005 | Griffin | |
| 2006/0007159 A1 | 1/2006 | Lane et al. | |
| 2006/0265643 A1 | 11/2006 | Saft et al. | |
| 2007/0074957 A1 | 4/2007 | Lam et al. | |

FOREIGN PATENT DOCUMENTS

| | | |
|---|---|---|
| JP | 4102607658 | 9/1998 |
| JP | 2001053851 | 2/2001 |
| WO | WO03/001775 | 1/2005 |

OTHER PUBLICATIONS

Bursky, "Evolving DSP chips do more", electronic Design, vol. 38, No. 23, pp. 51-59, Dec. 1990.

Dayton, "FRx extends reporting power of Platinum Series", PC Week, vol. 8, No. 5, p. 292(2), Feb. 1991.

Feigel, "IBM Motorola preview embedded Power PCs; 403 and 505 processors combine strong performance with low cost", Microprocessor Report, vol. 8, No. 6, pp. 1-5, May 1994.

Final Office Action for matter U.S. Appl. No. 10/080,437 dated Dec. 29, 2003.

Final Office Action for matter U.S. Appl. No. 10/080,437 dated Sep. 16, 2004.

Final Office Action for matter U.S. Appl. No. 11/948,838 dated Apr. 13, 2009.

Final Office Action for matter U.S. Appl. No. 10/080,437 dated Aug. 16, 2005.

Forbes et al., "Palm PCs get a Big Hand (What's Hot)", Windows Magazine, No. 905, p. 96, May 1998.

Gary et al., "Efficient MC68HC08 programming: reducing cycle count and improving code density", Dr. Dobb's Journal, vol. 290, No. 5, May 1995, pp. 70-75.

International Search Report and Written Opinion of the International Searching authority in International Application PCT/US2006/038790, European Patent Office, Oct. 24, 2007, 18 pgs.

Non-Final Office Action for matter U.S. Appl. No. 10/080,437 dated Aug. 22, 2003.

Non-Final Office Action for matter U.S. Appl. No. 10/080,437 dated Apr. 14, 2004.

Non-Final Office Action for matter U.S. Appl. No. 10/080,437 dated Jan. 14, 2005.

Non-Final Office Action for matter U.S. Appl. No. 11/948,838 dated Nov. 5, 2009.

Non-Final Office Action for matter U.S. Appl. No. 11/385,241 dated Oct. 3, 2006.

Non-Final Office Action for matter U.S. Appl. No. 11/948,838 dated Aug. 26, 2008.

Notice of Allowance for matter U.S. Appl. No. 11/385,241 dated Nov. 2, 2007.

Notice of Allowance for matter U.S. Appl. No. 10/080,437 dated Nov. 25, 2005.

Palm LifeDrive Quicktrain.qxd, Dec. 6, 2005, 3 pgs.

Penwarden, "More Muscle for HP's OmniBook", Windows Magazine, No. 501, p. 110, Jan. 1994.

Ruley et al,. "Handheld-to-Handheld Combat", Windows Magazine, No. 811, p. 55, Nov. 1997.

* cited by examiner

DETAIL A

HANDHELD COMPUTER

CROSS-REFERENCE TO RELATED APPLICATIONS

This application is a Continuation of U.S. patent application Ser. No. 11/385,241 filed on Mar. 20, 2006 now U.S. Pat. No. 7,333,326 entitled "Handheld Computer"; which is a Continuation of U.S. patent application Ser. No. 10/080,437 filed on Feb. 21, 2002 now U.S. Pat. No. 7,061,762 entitled "Handheld Computer With Open Accessory Slot"; which is a Continuation of U.S. patent application Ser. No. 09/244,440 filed on Feb. 4, 1999 now U.S. Pat. No. 6,388,877 entitled "Handheld Computer With Open Accessory Slot". All of the aforementioned priority applications are hereby incorporated by reference in their entirety.

BACKGROUND OF THE INVENTION

1. Field of the Invention

The present invention relates to a handheld computer. More particularly, the invention relates a handheld computer having a housing with a midframe construction, two accessory slots, or an integral infrared port.

2. Description of Related Art

Handheld computers, including personal digital assistants and palm-sized computers, provide the user with a wide variety of functions, such as a calendar, an address book, a task list, a notepad, and a calculator. These handheld computers may be approximately the size of a stack of 3"×5" index cards, sufficiently compact to fit into a shirt pocket.

Current handheld computers, such as the PalmPilot™ from 3Com Corporation, typically have a housing which consists of a mating front shell and back shell which are coupled to each other with screws. The front shell and back shell enclose the components of the handheld computer. Typically, a main board is mounted on one of the shells. Assembly of current handheld computer is often labor-intensive and time-consuming. Furthermore, the front shell and back shell need to be sufficiently structurally rigid to resist bending and twisting forces. Also, the main board may also need to be sufficiently thick to resist bending and twisting forces. As a result, these handheld computers may not be made as compact as desired due to the need for additional material.

Current handheld computers also typically have a single storage or retention slot for a stylus or writing device. This storage slot is usually on one side or the other of the handheld computer, and thus cannot equally accommodate both left-handed and right-handed users.

Current handheld computers also typically have an infrared port which is a port or window transmissive to infrared light. This port or window is usually installed in a hole or opening in the housing.

What is needed is a handheld computer having a housing which allows for easy assembly of the handheld computer and minimizes the amount of material required for the housing, yet provides sufficient structural rigidity.

What is also needed is a handheld computer capable of storing a stylus or writing device which can equally accommodate the preferences of both left-handed and right-handed users.

What is also needed is a handheld computer having a housing which simplifies the infrared port or eliminates the need to create a separate opening to install an infrared port.

SUMMARY OF THE INVENTION

The present invention is directed towards a handheld computer, comprising a housing including a midframe coupled to a front shell and a back shell. A substantial portion of at least one side of the midframe forms part of an exterior of the housing. The housing is capable of at least partially enclosing a plurality of components.

The present invention is also directed towards a handheld computer, comprising a housing having a first and second elongate accessory slots associated with a left and right sides of the housing, respectively. The first and second accessory slots are capable of receiving and accommodating at least one removable accessory device.

The present invention is also directed towards a handheld computer at least partially constructed of a material at least partially transmissive to infrared light and having a portion which acts as an infrared port.

DETAILED DESCRIPTION OF THE INVENTION

Figure 1A:
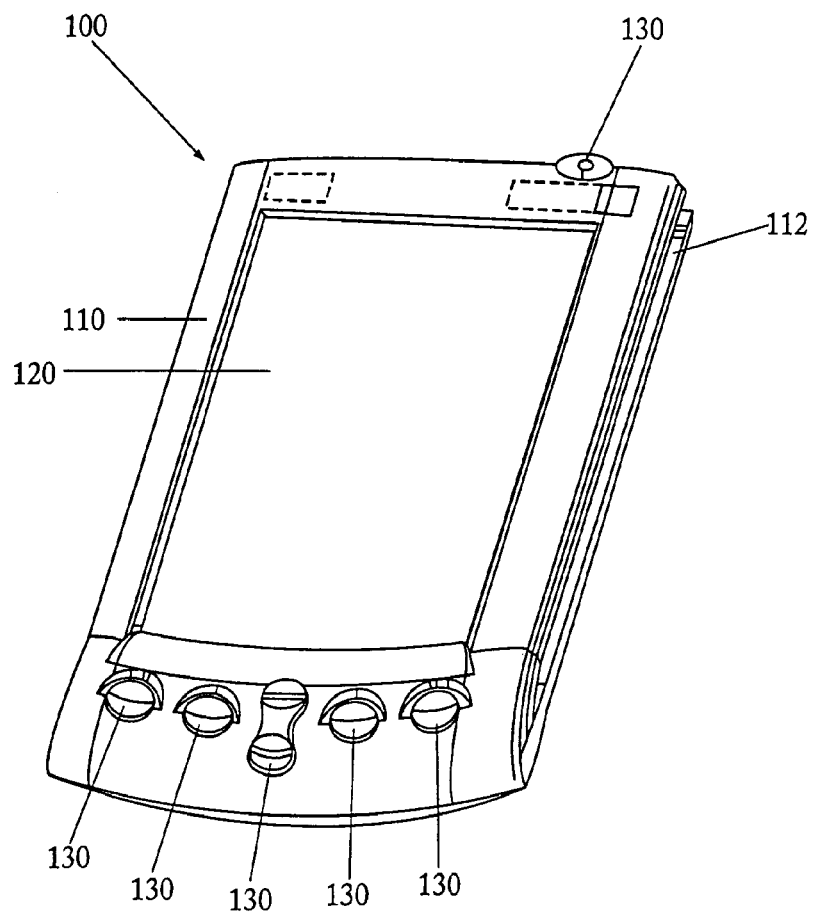
FIG. 1A shows a perspective view of one embodiment of a handheld computer of the present invention.
Figure 1B:
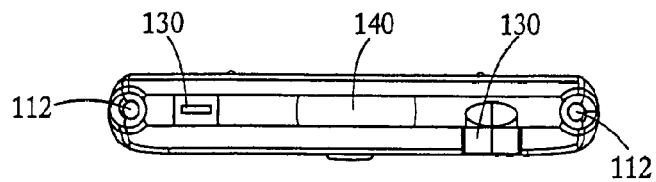
FIGS. 1B-1F show top, front, side, back, and bottom views of one embodiment of a handheld computer.
Figure 1C:
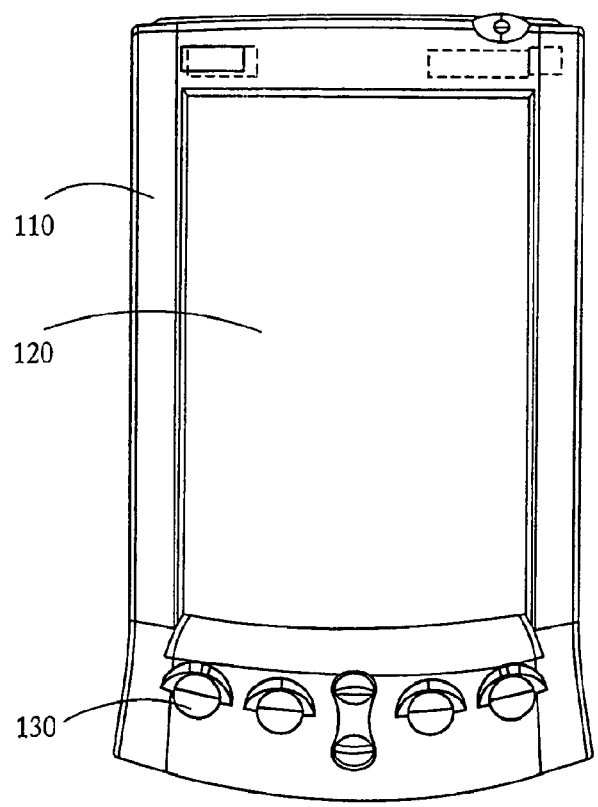
Figure 1F:
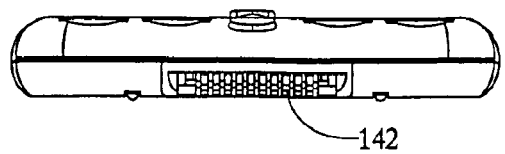
Figure 1D:
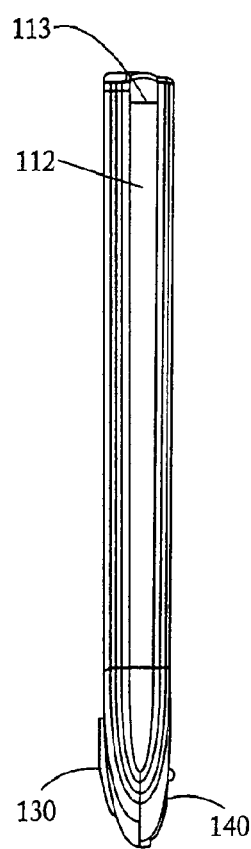
Figure 1E:
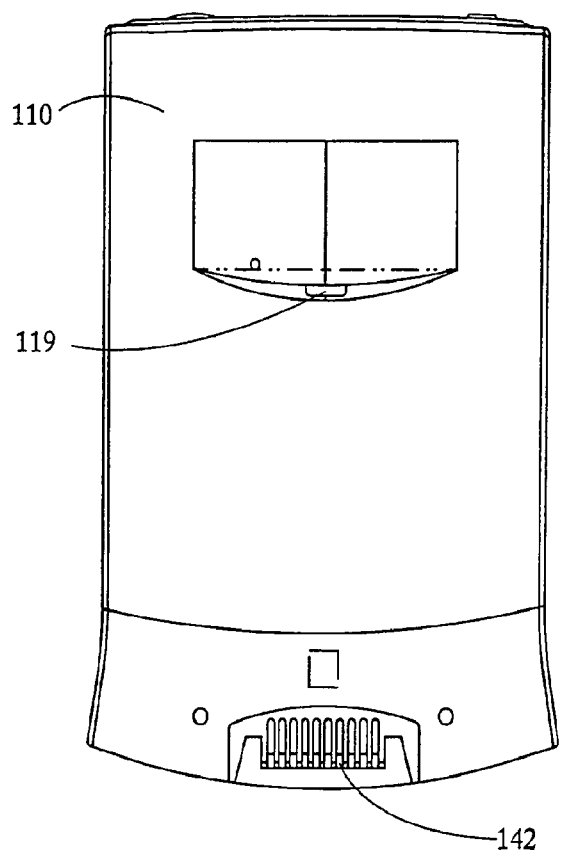
Figure 1G:
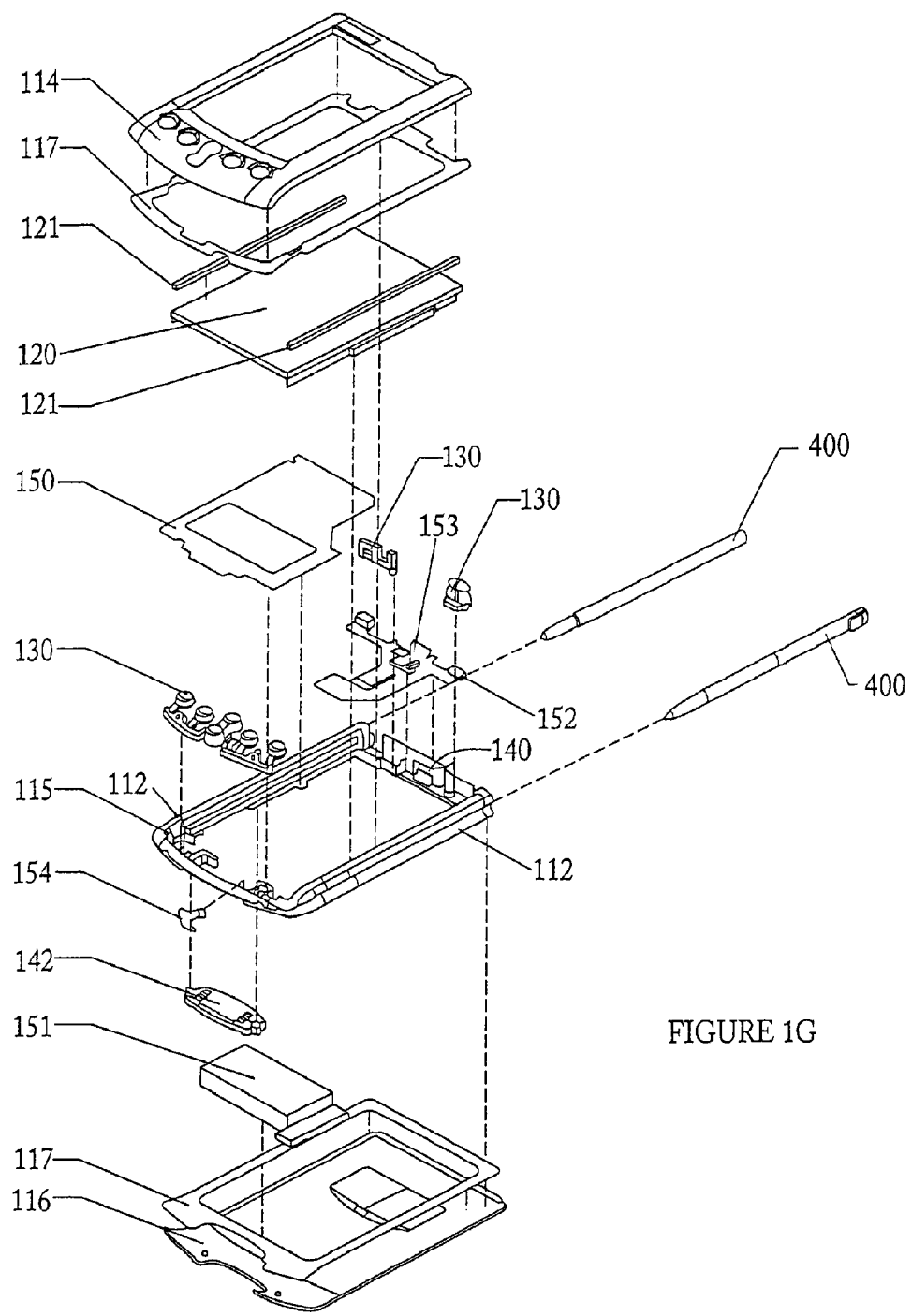
FIG. 1G shows an exploded view of one embodiment of a handheld computer.

The handheld computer of the present invention uses one or more features which help make the handheld computer more compact and easier to manufacture. One of these features is a housing which uses a sandwich construction. Another of these features is the use of partially open accessory slots for a stylus and other accessories. These accessory slots only partially enclose the accessories, and allow the handheld computer to be made narrower compared to completely enclosed accessory slots. Yet another of these features is an integral infrared port which is part of the housing of the handheld computer. This integral infrared port simplifies assembly of the handheld computer by eliminating the need for a separate window or port to be assembled with the housing.

FIG. 1A-1G show a perspective, top, front, side, back, bottom, and exploded views, respectively, of one embodiment of a handheld computer 100. Handheld computer 100 may run PalmOS™, Windows CE™, or any other suitable operating system. Handheld computer 100 is capable of running preprogrammed and/or installed applications, such as an electronic calendar and address book.

Handheld computer 100 includes a housing 110, which may be made up of one or more subhousings or sections. Housing 110 supports, encloses, and/or protects the components of handheld computer 100. These components may include a display 120, user interface devices 130, input/output devices 140, a main board 150, battery 151, a flexible circuit 152, and an electrostatic discharge device 154. Housing 110 includes openings, lens, and/or ports for the components of handheld computer 100, such as for the display 120, user interface devices 130, and input/output devices 140. Housing 110 may also include at least one mounting device 119, which allows the attachment of optional accessories such as a modem with a compatible mounting device. Mounting device 119 may be a combination of indentations and slots on the back of housing 110 designed to accommodate optional accessories.

Display 120 may be an LCD display, active matrix display, touch-sensitive display, or other suitable display. Display 120 may be separated from housing 110 by one or more gaskets 121. Gaskets 121 absorb shock and allow a close fit between housing 110 and display 120. If display 120 is a touch-sensitive display, gaskets 121 also act as a spacer to prevent housing 110 from inadvertently activating the touch-sensitive display.

User interface devices 130 allow the user to input data and commands into handheld computer 100. User interface devices 130 may include a touch-sensitive display, digitizer, stylus, and one or more buttons. A touch-sensitive display is capable of receiving commands tapped or written on display 120 with a finger, stylus, or other device. A digitizer is capable of digitizing handwritten input by the user on a touch-sensitive display and converting it to a computer-readable form. A digitizer may be incorporated into display 120.

Buttons may be mechanical buttons, or implemented on a digitizer or touch-sensitive display. Mechanical buttons may be flat, convex, concave, or any other desired shape and texture. Mechanical buttons may be formed individually, or several mechanical buttons may be formed on a single strip for ease of manufacturing and installation. Buttons may be fixed or programmable to activate a variety of applications such as a calendar, an address book, a task list, a notepad, a menu, a calculator, a search program, and other applications. Buttons may also activate device functions such as scrolling functions, power, reset, and display adjustment. Scrolling functions allow the user to scroll across screens shown on display 120. Scrolling functions may be a implemented on a rocker switch designed to prevent both scroll up and scroll down buttons from being pressed simultaneously. Power allows the user to turn on and off handheld computer 100. Reset allows the user to reset handheld computer 100. Display adjustment allows the user to adjust parameters on display 120, such as brightness or contrast. Display adjustment may be used alone or in conjunction with other buttons such as scroll up and scroll down buttons, or bring up a software implementation of display adjustment.

Input/output devices 140 allow handheld computer 100 to communicate and exchange information with other electronic apparatus. Input/output devices 140 may include one or more infrared ports and external ports. An infrared port includes an infrared transmitter/receiver 153 positioned next to a window or port which is at least partially transmissive to infrared light. One embodiment of an infrared port is discussed further below. An external port includes one or more external contacts which may receive mating connectors in different fashions. For example, external port may receive peripheral connectors in a sliding fashion or a contact-only fashion. External ports may be located on any side or within an accessory slot 122 of handheld computer 100. External ports may be integrated into housing 110, or may be manufactured as a separate connector assembly which is then assembled into handheld computer 100. An external port may also be used for recharging a rechargeable battery in handheld computer 100.

Main board 150 may be a printed circuit board which includes integrated circuits and connections for display 120 and other components. Main board 150 may include a processor and memory. Main board 150 may also include transceivers, [clicker buttons], and various connections to other components.

Battery 151 provides power to handheld computer 100, and may be rechargeable or disposable, fixed or removable. Battery 151 may be a Li-ion (lithium ion), NiMH (nickel metal hydride), NiCd (nickel cadmium), alkaline, or any other suitable battery.

Flexible circuit 152 may be used to connect main board 152 to some or all of the other components of handheld computer 100. Flexible circuit 152 may be constructed of a thin, flexible material such as Mylar™ which allows handheld computer 100 to be made thinner than with a printed circuit board. Flexible circuit 152 may also be used to carry components, such as an infrared transmitter/receiver 153. Flexible circuit 152 may also act as a shield or cover to prevent the entry of dust and prevent optional accessories using or inserted through mounting device 119 from short circuiting any of the internal components of handheld computer 100.

Electrostatic discharge device 154 may ground housing 110 to main board 150 if some or all of housing 110 is made of a conductive material such as a metal. Electrostatic discharge device 154 prevents damage to components from electrostatic discharge between housing 110 and main board 150 or other components, and prevents damage from excessive voltage or current. Electrostatic discharge device 154 may be an electrostatic discharge clip or other device made of a conductive material.

Housing With Left and Right Accessory Slots

In one embodiment of handheld computer 100, housing 110 includes two accessory slots 112 which can accommodate different accessory devices designed for use with handheld computer 100, such as a stylus 400. Accessory slots 112 are located on the left side and the right side of housing 110 to equally accommodate the preferences of both left-handed and right-handed users. Accessory slots 112 may only partially enclose accessory devices along the length of the accessory devices, and thus allow handheld computer 100 to be made narrower and thinner than with completely enclosed accessory slots. Accessory slots 112 may be substantially cylindrical. A portion along substantially the length of an accessory device may be exposed to the exterior of handheld computer 100. Accessory devices may be inserted end first into housing 110 at an open end of accessory slot 112. Accessory slots 112 may have a retaining device 113 to prevent accessory devices from accidentally falling out. Retaining device 113 may be a detent or notch which corresponds to a matching detent or notch on accessory devices. Retaining device 113 may also be a door, clip, or other mechanism. Accessory slots 112 may also be designed to have an interference fit or a snap fit with accessory devices to prevent accessory devices from falling out. One end of housing 110 may be flared out, or be slightly wider than the rest of housing 110, and at least partially enclose the tip of an accessory device and act as a stop after an accessory device has been fully inserted into accessory slot 112. Accessory devices may also simply clip sideways into accessory slots 112.

A method of manufacturing handheld computer 100 may include providing housing 110, forming an accessory slot 112 on a left side of housing 110, and forming another accessory slot 112 on a right side of housing 110.

Housing With Midframe Construction

In one embodiment of handheld computer 100, housing 110 is made up of a midframe 115 sandwiched between a front shell 114 and a back shell 116. Importantly, along with front shell 114 and back shell 116, one or more surfaces of midframe 115 form part of the exterior of handheld computer 100. Midframe 115 may be as wide as front shell 114 or back shell 116. Midframe 115 may be partially enclosed by one or both of front shell 114 and back shell 116. Midframe 115 holds in place one or more of the internal components of handheld computer 100. Midframe 115, front shell 114 and back shell 116 enclose and protect the internal components. Midframe 115, front shell 114, and back shell 116 may be constructed of aluminum, stainless steel, plastic, or any other suitable material. Midframe 115, front shell 114, and back shell 116 may also be coupled together using one or a combination of screws, hinges, clips, other suitable fasteners, and adhesives.

Adhesives may be adhesive sheets 117 formed into suitable shapes which roughly approximate the outline of midframe 115, front shell 114, and back shell 116. Adhesives may also be hot melt adhesives, pressure sensitive adhesives, or any other suitable liquid or solid adhesives.

Together with the other components of handheld computer 100, midframe 115, front shell 114, back shell 116 provide most of the structural rigidity. However, the use of adhesives in the sandwich construction of housing 110 prevents midframe 115, front shell 114, and back shell 116 from sliding relative to each other when housing 110 is subjected to bending and torsional forces, thus significantly enhancing bending and torsional stiffness.

Figure 2A:
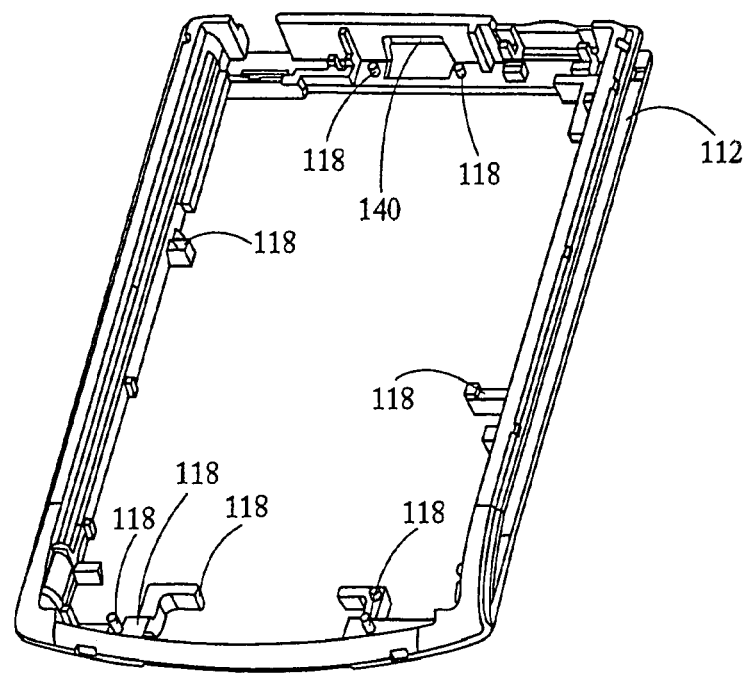
FIG. 2A shows a perspective view of one embodiment of a midframe.
Figure 2B:
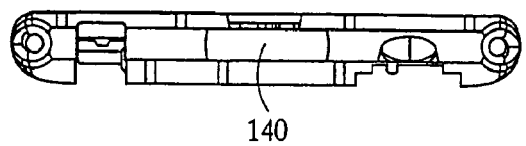
FIGS. 2B-2G show top, left side, front, right side, back, and bottom views of one embodiment of a midframe.
Figure 2C:
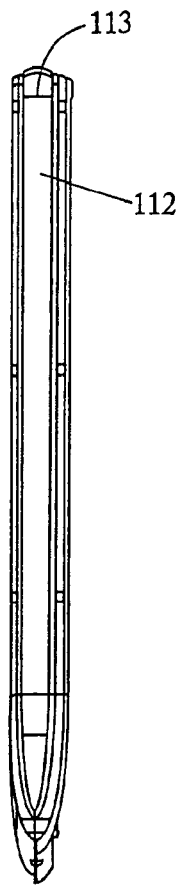
Figure 2D:
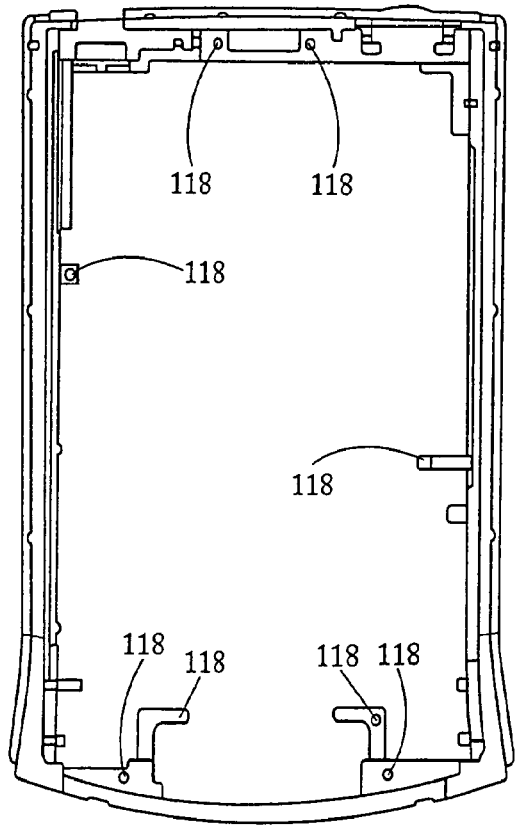
Figure 2G:
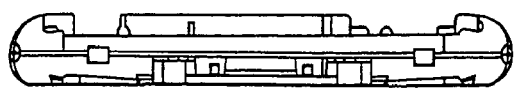
Figures 2E, 2F:
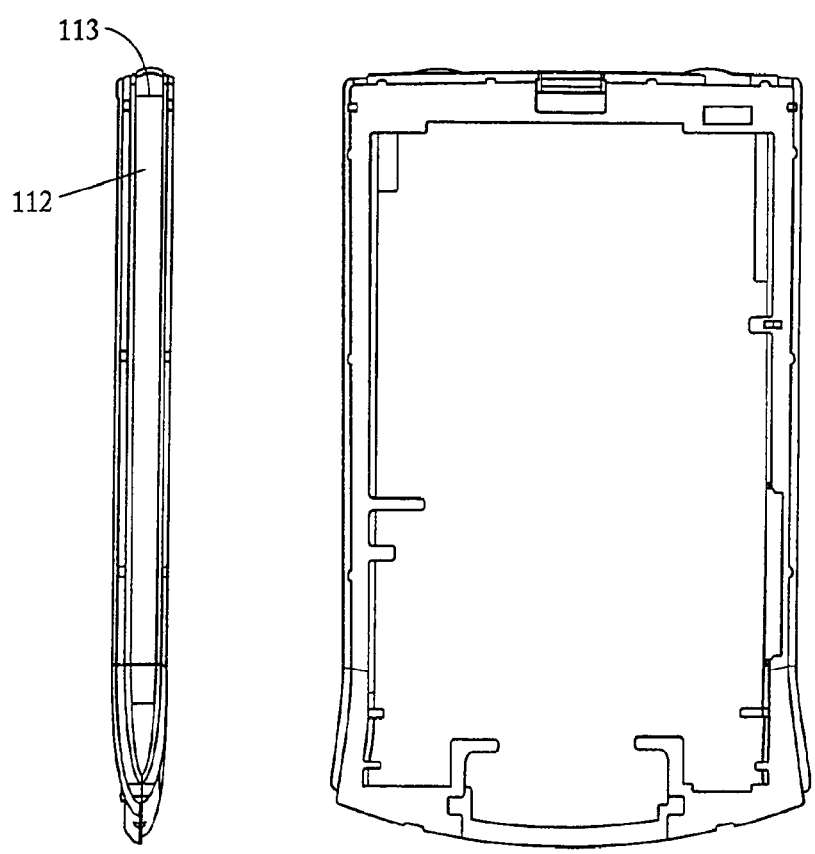

FIG. 2A shows a perspective view of one embodiment of midframe 115. FIGS. 2B-2G show top, left side, front, right side, back, and bottom views of one embodiment of midframe 115.

Midframe 115 may include one or both accessory slots 112. Midframe 115 also includes engaging structures 118 such as supports, tabs, posts, and clips which couple to corresponding component structures in the various components, or even the components themselves, of handheld computer 100. For example, midframe 115 may include posts which match up to holes in main board 150, as well as clips which match up with an edge of main board 150 to receive and hold in place main board 150. This may be accomplished using one or a combination of an interference fit, snap fit, or crush ribs, in which case no screws, glues, or other fasteners are necessary for installation of main board 150 onto midframe 115. In similar fashion, some or all of the components of handheld computer 100 can be installed onto midframe 115 before front shell 114 and back shell 116 are fastened to midframe 115 to substantially enclose the components and complete assembly of handheld computer 100.

Midframe 115 may also at least partially form some or all of the various openings, lens, and/or ports for display 120, user interface devices 130, and input/output devices 130. For example, midframe 115 may include openings to accommodate one or more user interface devices 140 such as a power button and a display button. As another example, midframe 115 may include external ports to accommodate external contacts for connecting handheld computer 100 to other electronic apparatus. As yet another example, midframe 115 may include a lens or window for allowing infrared transmitter/receiver 153 inside handheld computer 100 to communicate with other electronic apparatus outside handheld computer 100.

Some or all of the features which may be found in midframe 115, such as accessory slots 112 and engaging structures 118, may be formed as integral parts of midframe 115, thus reducing the complexity and cost of midframe 115 and thus housing 110. For example, if midframe 115 is made of an injection molded plastic, some or all of the features mentioned previously may also be injection molded in the same operation.

A method for manufacturing handheld computer 100 may include providing housing 110 which includes midframe 115, front shell 114, and back shell 116, coupling one or more components to midframe 115, and then coupling front shell 114 and back shell 116 to midframe 115.

Housing With Integral Infrared Port

In one embodiment of handheld computer 100, some or all of housing 110 may be constructed of a material which is at least partially transmissive to infrared light. A portion of housing 110, such as a portion immediately adjacent to an infrared transceiver housed within housing 110, may then allow transmission of infrared signals through housing 110 and thus be used as an infrared port. Such a portion of housing 110 may be polished and/or made thinner relative to the remainder of housing 110, so as to enhance transmission of infrared signals through housing 110. For example, if housing 110 and thus the infrared port is injection molded, the tool may be polished to an SPI A-2 level on either or both the front and back of the infrared port to reduce transmission losses.

Figure 3C:
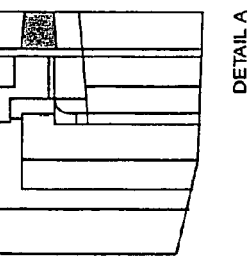
FIGS. 3A-3C show front, cutaway, and close-up views, respectively, of an infrared port which is a portion of the midframe.
Figure 3B:
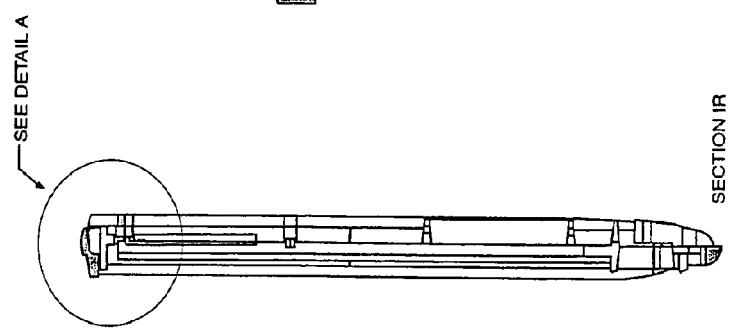
Figure 3A:
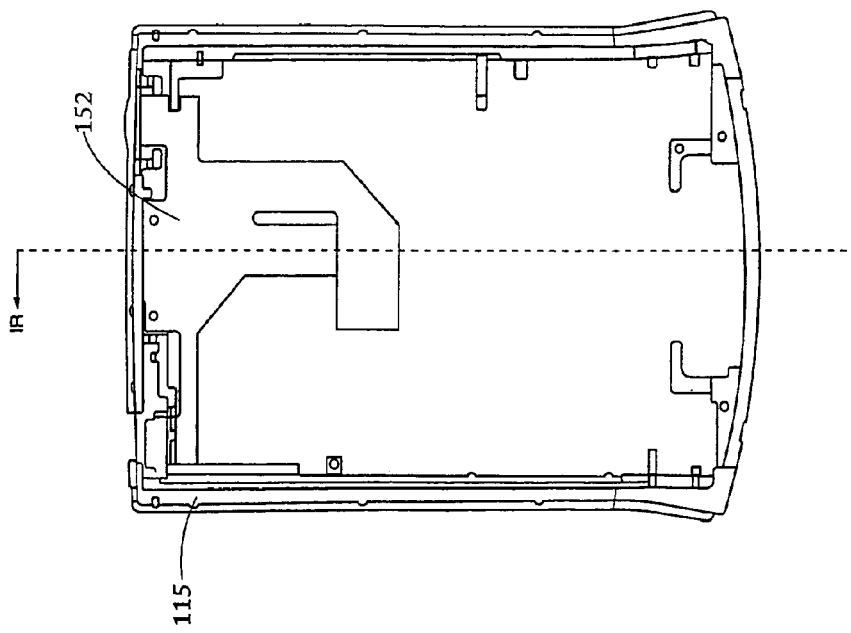

FIGS. 3A-3C show front, cutaway, and close-up views, respectively, of an infrared port which is an integral part of midframe 115. Midframe 115 may be constructed of a plastic which is at least partially transmissive to infrared light. This plastic may also be opaque to visible light, so that the interior of handheld computer 100 cannot be seen. The infrared port may be any part of housing 110 exposed to an exterior of handheld computer 100, or it may be a portion of midframe 115 adjacent to infrared transmitter/receiver 153 inside handheld computer 100. This portion of midframe 115, shown in FIG. 3C as the shaded section, may be polished and made thinner than the remainder of midframe 115 to enhance transmission of infrared signals. An infrared port of this design which is an unremoved portion of midframe 115 provides improved structural rigidity, as well as reduces part and assembly costs, as compared to an infrared port which requires a section of midframe 115 to be removed.

A method for manufacturing a handheld computer 100 may include providing housing 110, housing 110 being at least partially constructed of a material at least partially transmissive to infrared light, housing 110 capable of enclosing a plurality of components including infrared transmitter/receiver 153, and forming the infrared port in housing 110, the infrared port being a portion of housing 110 adjacent to infrared transmitter/receiver 153.

Housing Alternative Embodiments

In other embodiments of handheld computer 100, housing 110 may be made up of one, two, or three or more subhousings or sections. For example, housing 110 may be made up of two opposing shells, in which half of each accessory slot 112 may then be formed. As another example, front shell 114 and midframe 115 may actually be formed as one continuous section of housing 110, with back shell 116 being a second section of housing 110. As yet another example, midframe 115 may only extend partially along the length of housing 110, or midframe 115 may be comprised of two or more continuous or noncontinuous sections. Other combinations and housing designs are possible.

Accessory Devices

Many different accessory devices may be designed to be used with handheld computer 100. These accessory devices may be attached the back of handheld computer 100 using mounting device 119, or they may be attached using one or both of accessory slots 112. Examples of accessory devices include docking devices, modems, printers, and cellular phones.

Figure 4A:
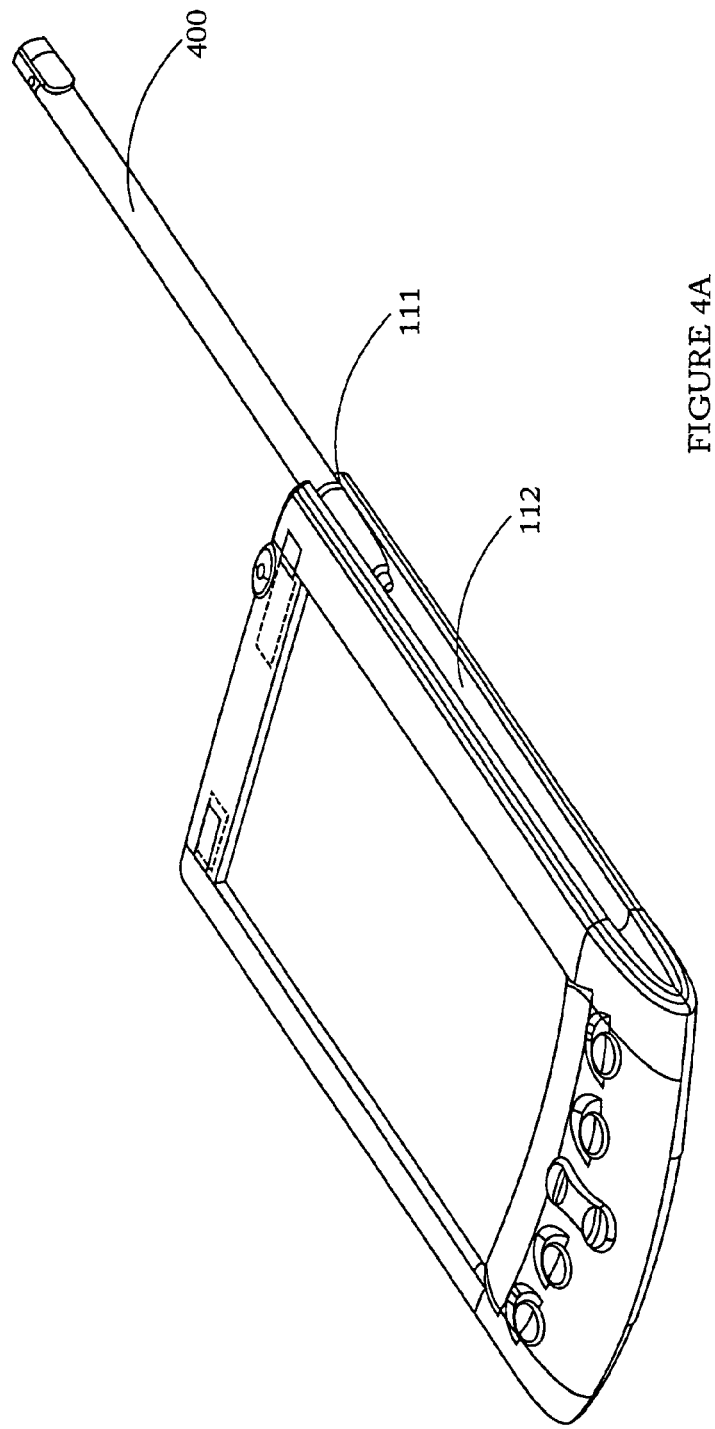
FIG. 4A shows a stylus partially inserted into one of the accessory slots of the housing.
Figure 4B:
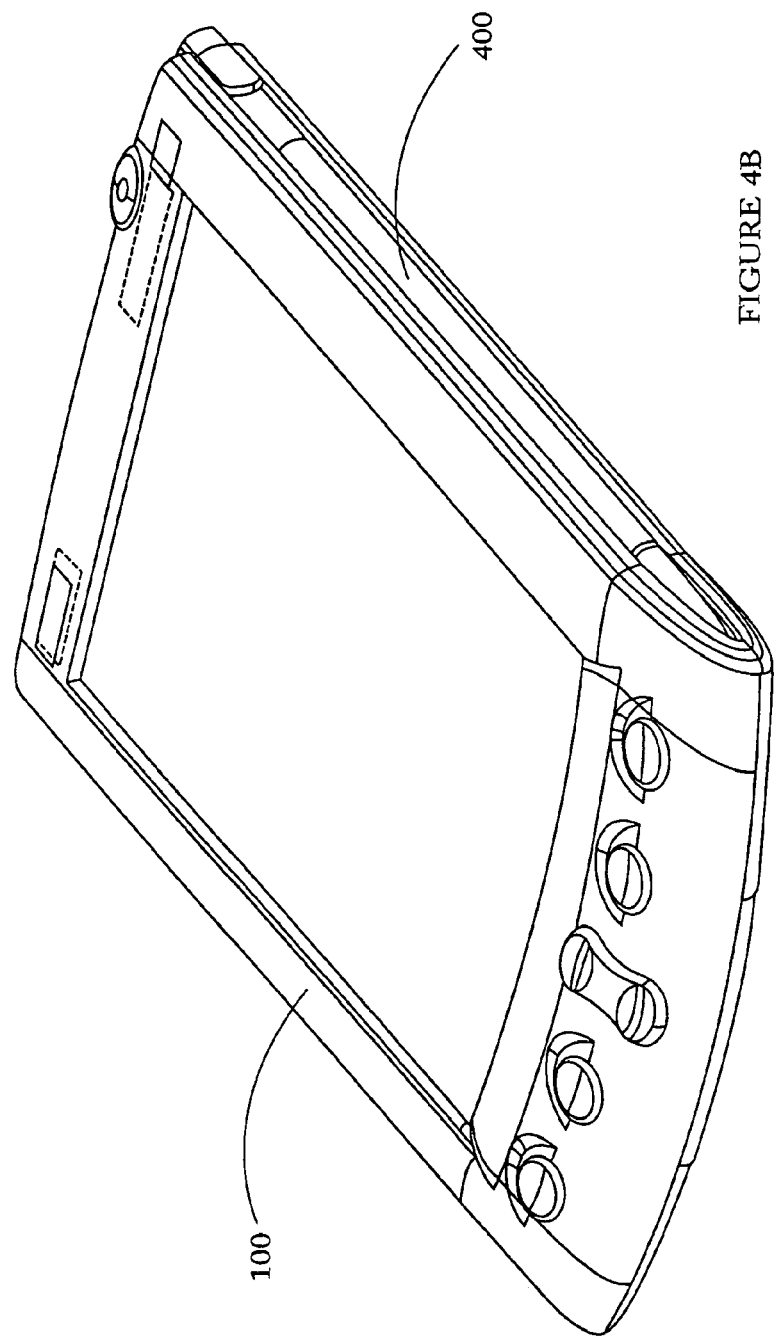
FIG. 4B shows a stylus fully inserted into one of the accessory slots of the housing.

FIG. 4A shows a stylus 400 partially inserted into one of the accessory slots 112 of housing 110. FIG. 4B shows stylus 400 fully inserted into one of the accessory slots 112 of housing 110. Where display 120 is a touch-sensitive display or incorporates a digitizer, stylus 400 may be used to enter instructions and handwritten characters. Stylus 400 may be stored in either one of accessory slots 112 to equally accommodate the preferences of both left-handed and right-handed users.

Figure 5A:
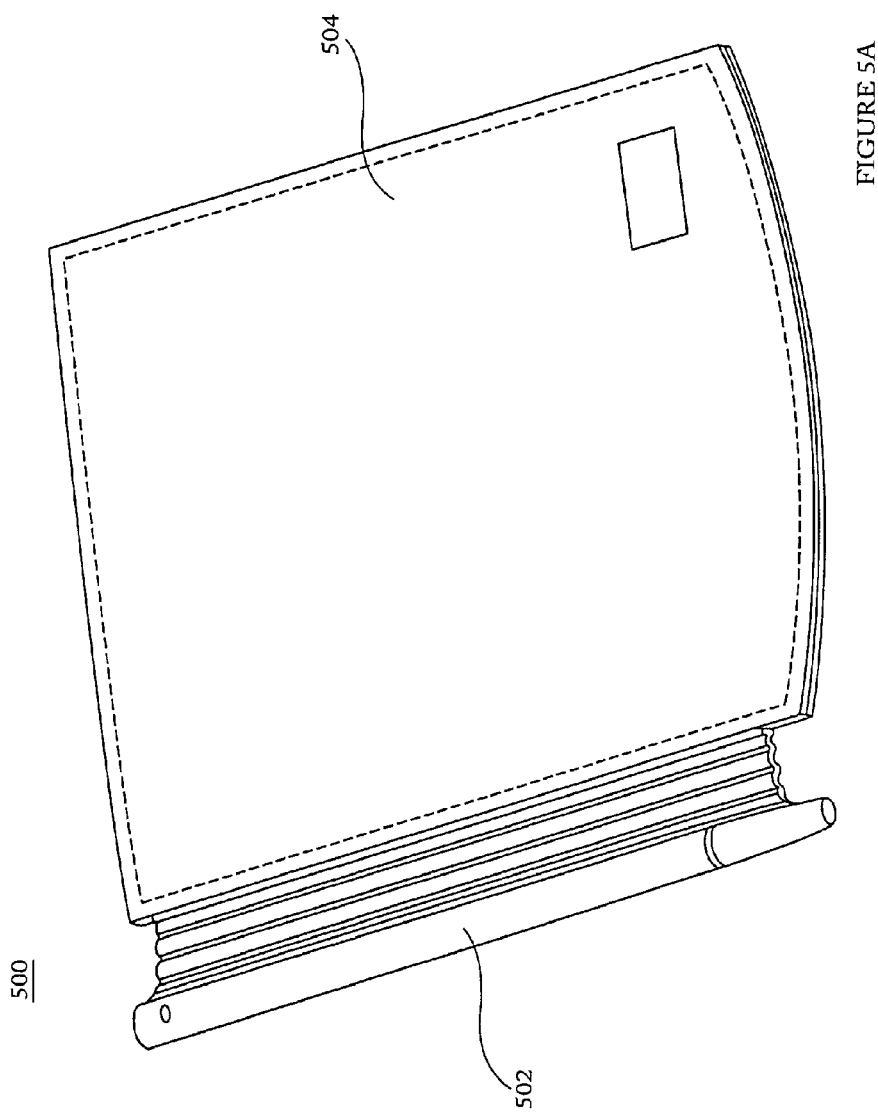
FIG. 5A shows a cover capable of being inserted into one of the accessory slots of the housing.
Figure 5B:
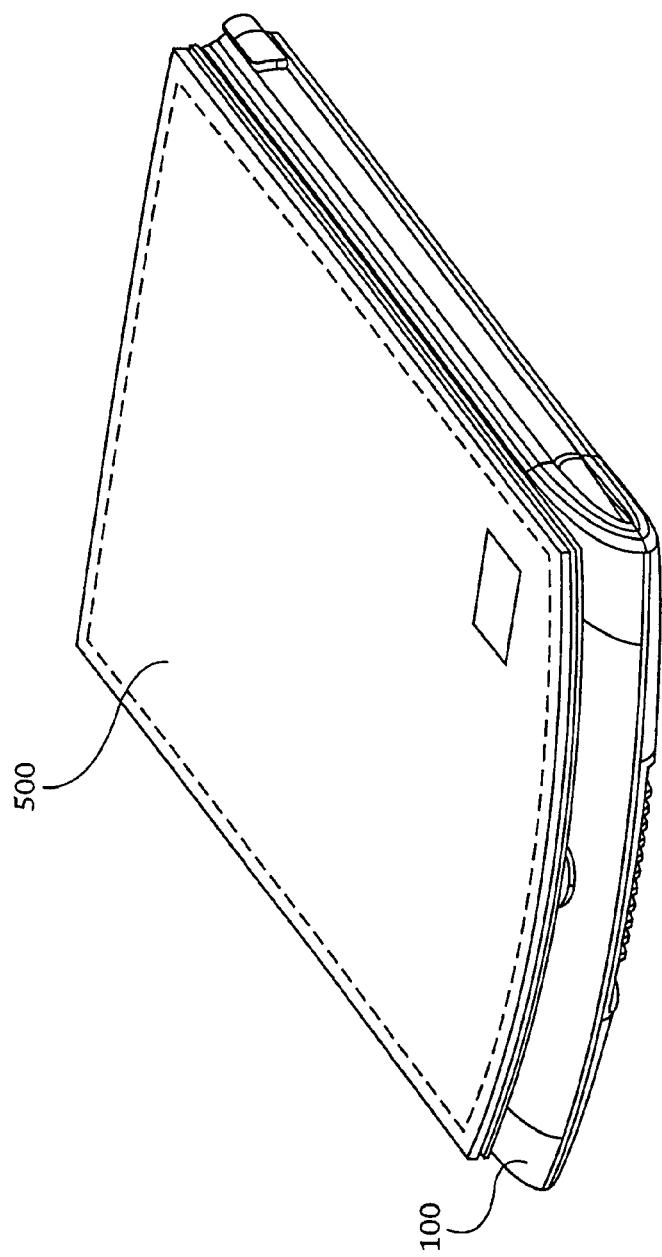
FIG. 5B shows the cover inserted into one of the accessory slots of the housing.

FIG. 5A shows a cover 500 capable of being used with one of the accessory slots 112 of housing 110. FIG. 5B shows cover 500 used with one of the accessory slots 112 of housing 110. Cover 500 includes an elongate member 502 coupled to an edge of a cover panel 504. Elongate member 502 fits into either accessory slot 112, which allows cover panel 504 to fold over the front of handheld computer 100. Cover 500 thus protects display 120 and some or all of user interface devices 130 of handheld computer 100. Cover 500 may be made of one or a combination of plastic, rubber, fabric, leather, or any other suitable material.

Cover 500 may also include two elongate members 502 coupled to two opposite edges of a cover panel 504. Both elongate members 502 fit simultaneously into both accessory slots 112 and hold cover panel 504 across the front of handheld computer 100.

Figure 6A:
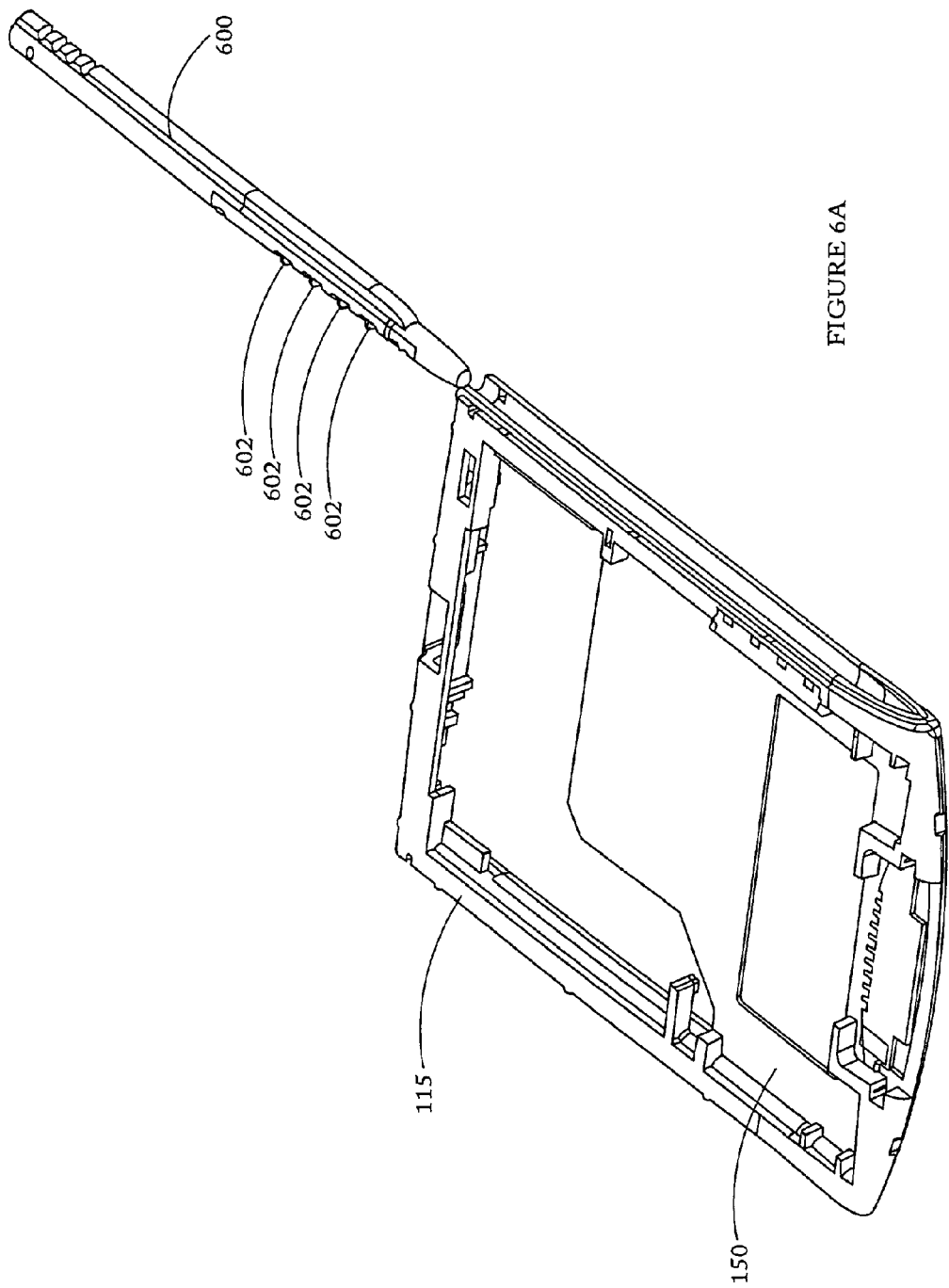
FIG. 6A shows an input/output stylus about to be inserted into one of the accessory slots of the housing.
Figure 6B:
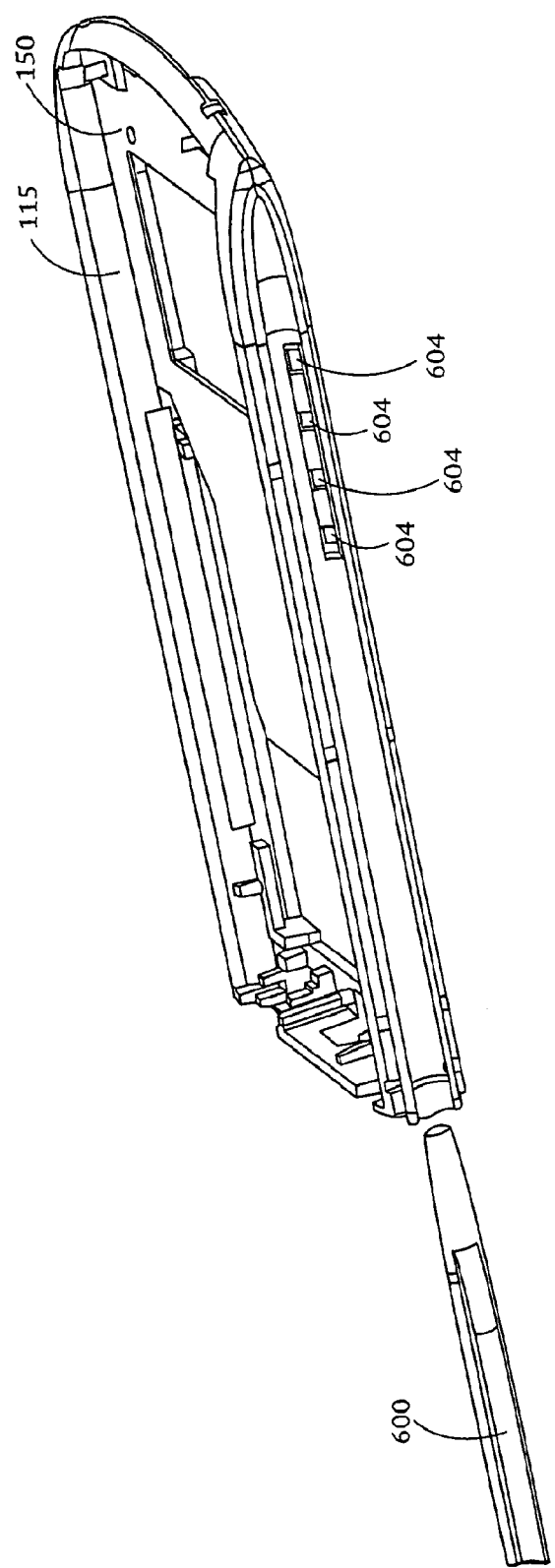
FIG. 6B shows a close-up view of accessory slot contacts located within an accessory slot.

FIGS. 6A-6B show another embodiment of handheld computer 100 having an external port with accessory slot contacts 604 located within one of accessory slots 112. FIGS. 6A-6B show an input/output stylus 600 about to be inserted into accessory slot 112 having accessory slot contacts 604. Input/output stylus 600 includes stylus contacts 602 which electrically connect with accessory slot contacts 604 when input/output stylus 600 is inserted into accessory slot 112. Input/output stylus 600 may be a functional device itself, or may be a connection to other devices such as a printer.

Although stylus 400, cover 500, and input/output stylus 600 are shown in the figures fully inserted into accessory slots 112, these and other accessory devices may be designed to be only partially inserted into accessory slots 112.

The foregoing description of the invention has been presented for purposes of illustration and description. It is not intended to be exhaustive or to limit the invention to the precise forms disclosed. Many modifications and variations will be apparent. It is intended that the scope of the invention be defined by the following claims and their equivalents.

What is claimed is:

1. A mobile computing device comprising:
   a touch-sensitive display;
   a front shell to house the touch-sensitive display;
   a mid-frame coupled to the front shell, the mid-frame including a plurality of engaging structures to fasten internal components of the mobile computing device to the mid-frame, the mid-frame further including one or more openings for one or more ports on at least a top edge of the mid-frame to connect external components with the internal components; and
   a rear shell coupled to the mid-frame.

2. The mobile-computing device of claim 1, further comprising a lens coupled to a front surface of the mid-frame, wherein the front shell includes an opening corresponding to a perimeter of the lens.

3. The mobile computing device of claim 1, further comprising a lens coupled to a rear surface of the mid-frame, wherein the rear shell includes an opening corresponding to a perimeter of the lens.

4. The mobile computing device of claim 1, wherein the rear shell includes one or more clips to releasably couple to the mid-frame.

5. The mobile computing device of claim 1, further comprising one or more gaskets disposed between the touch-sensitive display and the front shell.

6. The mobile computing device of claim 1, further comprising a main board coupled to the mid-frame, the main board including a processor, a memory and one or more connectors for the touch-sensitive display.

7. The mobile computing device of claim 1, further comprising an electrostatic discharge device coupled to the main board.

8. The mobile computing device of claim 6, wherein the main board is to interference fit with the mid-frame.

9. The mobile computing device of claim 6, wherein the main board is to snap fit with the mid-frame.

10. The mobile computing device of claim 6, wherein the main board is a printed circuit board.

11. The mobile computing device of claim 6, wherein one or more of the engaging structures includes one or more clips to hold the main board in place.

12. The mobile computing device of claim 1, further comprising a flexible circuit coupled to the mid-frame, the flexible circuit to carry one or more of the internal components of the mobile computing device.

13. The mobile computing device of claim 12, wherein the flexible circuit is sealed to the one or more openings to prevent entry of dust and/or short circuiting of any of the internal components.

14. The mobile computing device of claim 12, wherein the flexible circuit is made from a Mylar® material.

15. The mobile computing device of claim 1, wherein the front shell and the rear shell each couple to the mid-frame to expose a lateral portion of the mid-frame, and wherein the lateral portion of the mid-frame is formed to include a partially exposed accessory slot having an opening on the top edge of the mid-frame.

16. The mobile computing device of claim 1, further comprising one or more adhesive sheets to couple the mid-frame to one or more of the front shell or the rear shell.

17. The mobile computing device of claim 16, wherein the one or more adhesive sheets are formed to outline the mid-frame.

18. The mobile computing device of claim 16, wherein the one or more adhesive sheets are hot melt adhesives to seal the mid-frame with one or more of the front shell or the rear shell.

19. The mobile computing device of claim 18, wherein the hot melt adhesives solidify to provide structural rigidity to the mobile computing device.

20. The mobile computing device of claim 1, wherein the mid-frame is constructed to include the plurality of engaging structures to attach all of the internal components of the mobile computing device to the mid-frame.

* * * * *

UNITED STATES PATENT AND TRADEMARK OFFICE
CERTIFICATE OF CORRECTION

PATENT NO. : 8,804,332 B2  
APPLICATION NO. : 11/772093  
DATED : August 12, 2014  
INVENTOR(S) : Francis James Canova, Jr. et al.

Page 1 of 1

It is certified that error appears in the above-identified patent and that said Letters Patent is hereby corrected as shown below:

On the Title page, in item (75), Inventors, in column 1, line 8, delete "Maccahim" and insert -- Maccabim --, therefor.

Signed and Sealed this
Eighteenth Day of November, 2014

Michelle K. Lee
*Deputy Director of the United States Patent and Trademark Office*